July 14, 1959 W. DUBILIER 2,894,321
COLD PRESSURE WELDING
Original Filed April 18, 1950
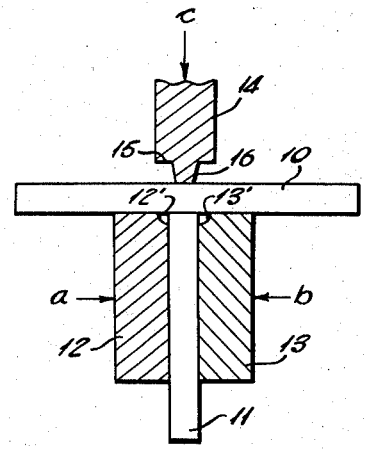
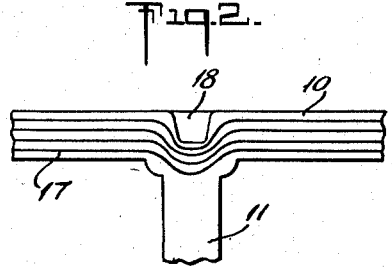
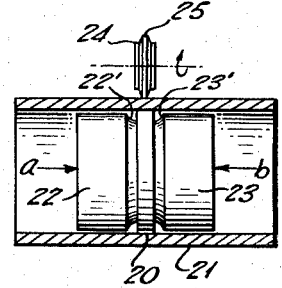
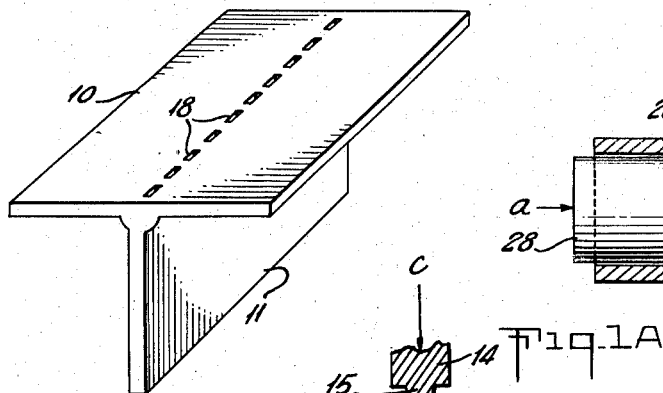
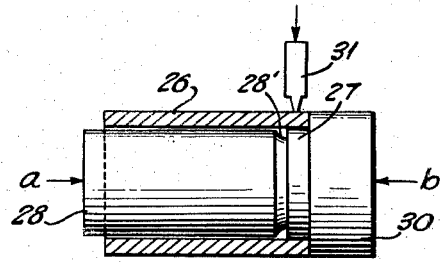
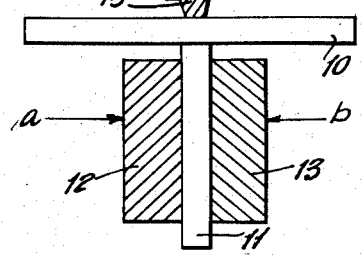
INVENTOR
WILLIAM DUBILIER
BY
ATTORNEY United States Patent Office 2,894,321
Patented July 14, 1959

2,894,321

COLD PRESSURE WELDING

William Dubilier, New Rochelle, N.Y., assignor, by mesne assignments, to Kelsey-Hayes Company, Detroit, Mich., a corporation of Delaware Original application April 18, 1950, Serial No. 156,541. Divided and this application April 19, 1954, Serial No. 424,030

3 Claims. (Cl. 29—470.1)

This application is a division of my application Serial No. 156,541, filed April 18, 1950, entitled Arrangements for and Methods of Cold Welding, now abandoned.

The present invention relates to cold pressure welding, i.e. the joining of metal members solely by pressure and without the addition of welding heat, in particular the welding of aluminum, copper and other metals or alloys capable of being cold pressure welded.

A method of welding together the contacting surfaces of two strips, plates, flanges or similar members of metal capable of being cold pressure welded has been proposed which comprises applying pressure to said members along a continuous line or upon a localized preferably rectangular area by means of suitable pressure tools or dies, to effect a percentage reduction in thickness of the two strips or the like members to be welded. Given a proper design of the shape and dimension of the welding dies and a proper control of the welding pressure to result in a predetermined percentage reduction of the total work thickness (about 70% in case of aluminum and 86% for copper), dependable and mechanically strong cold weld joints can be produced in a relatively simple manner by causing the metal sufficiently to flow at the contacting area or interface, in such a manner as to cause the metals of the adjoining surfaces to merge into a solid phase cold weld joint.

The cold pressure welding process as heretofore known has been practically limited to the making of lap joints connecting two superimposed relatively flat members or parts, such as plates, strips, sheets, flanges or the like with the thickness of the overlapping portions being indented or reduced by the welding tools or dies, in the manner pointed out.

An object of the present invention is the provision of a method of and means for producing a cold welded T-joint by butt welding the edge of a first work piece or member of cold pressure weldable metal, such as a plate, wire, etc. to the flat surface of a plate or a similar work piece arranged at right angles to the former.

The invention will be better understood from the following description of a few practical embodiments taken in reference to the accompanying drawing forming part of this specification and wherein:

Fig. 1 illustrates diagrammatically a basic arrangement for cold pressure welding together in a T-joint a pair of plates or the like in accordance with the principles of the invention;

Fig. 1A illustrates a modification of the arrangement of Fig. 1;

Fig. 2 is an enlarged cross-section of the joint obtained by means of a tool according to Fig. 1;

Fig. 3 is an isometric view of the joint according to Fig. 2;

Fig. 4 illustrates a method of securing a separating disc in a tube according to the invention; and Fig. 5 illustrates the joining of a closure disc to the end of a metal tube by cold pressure welding according to the invention.

Like reference characters identify like parts in the different views of the drawing.

With the above object in view, the invention involves generally the supporting of a first plate or member with its clean butt end in contact with the surface of a second member to be connected thereto in a T-joint and the application to the members of sufficient welding pressure to cause both an indentation of the second member and an upsetting of the first member, to thereby produce an interfacial metal flow as a result of the combined indenting and upsetting actions conducive to joining of the members by a solid phase welding bond without the addition of any welding heat. By a proper design of the welding tools, the metal flow is restricted or diverted in the direction of the interface, to result in an intensified action at the interface and merging of the members into a solid phase welding bond with a minimum indentation or metal reduction being required.

Referring to Fig. 1 of the drawing, there is shown a first plate 10 and a second plate 11 to be welded thereto at right angle in a T-joint, both said plates consisting of metal capable of being cold pressure welded such as aluminum, copper, etc. Plate 11 is arranged at a right angle to and with its upper end abutting against the lower face of the plate 10, preparatory to the joining of the plates by cold pressure welding. For this purpose, plate 11 is held or gripped by a pair of anvils or jaws 12 and 13 with the edge of plate 11 arranged, in the example shown, flush with the upper faces of the anvils. The latter may constitute or form the jaws of a vise or similar clamping apparatus, sufficient pressure being applied in the direction of the arrows $a$ and $b$ to firmly grip and prevent slippage of the plate 11 during the welding operation. The anvils 12 and 13 are provided with suitable recesses 12' and 13', respectively, at their inner ends adjacent to the edge of the plate 11.

The joining of the plates by cold welding is effected by means of a cooperating die 14 having a shoulder 15 and a projecting welding tip or tongue 16, said die forming part of a suitable press or equivalent device for applying pressure in the direction of the arrow $c$ upon the upper face of plate 10 and in the direction of plate 11. As a result, an indentation 18, Fig. 2, in the plate 10 and compression or upsetting of the adjoining edge of member 11 will be caused, resulting in a metal flow in an outward or lateral direction along the interface. Given a proper design of the welding tip 16 and control of the welding pressure, the adjoining metals of both members will thus be caused to merge, as indicated by the flow lines 17 in Fig. 2, in such a manner as to result in an intimate solid phase cold weld joint between the members. The recesses 13' allow the metal displaced by the tip 16 and as a result of the upsetting action to flow laterally outwardly along the interface and to leave a projection or stiffening rib in the corner between the members upon completion of the welding operation.

As is understood, the shape and dimensions of the welding tip 16 should be properly designed in relation to the thickness of the plates or other work pieces to be joined, both in order to cause a sufficient cold flow of the metal at the interface and to result in a predetermined metal reduction or depth of the indentation 18. The latter is advantageously determined or controlled by the height of the tip 16 which acts as a stop or abutment for the die 14. In this manner, dependable and mechanically strong cold weld joints may be obtained. Alternatively, the depth of penetration of the tool 14 may be controlled by means of a stop associated with the press or other pressure applying means used.

The adjoining surfaces of the plates 10 and 11 to be welded should be sufficiently cleaned prior to the welding operation, preferably by scratch-brushing, to remove any oxide film or other surface contamination liable to impede or prevent the attainment of an intimate and reliable cold weld joint.

In Fig. 1 the plate 11 is shown arranged flush with the upper surfaces of the anvils 12 and 13 with the recesses 12' and 13' serving to allow the upset metal to flow laterally and along the interface, to result in a cold weld joint in the manner pointed out. According to a modified arrangement, the plate 11, as shown in Fig. 1A, may project slightly beyond the upper faces of the anvils 12 and 13, in which case the recesses 12' and 13' may be omitted, the metal again being upset and caused to flow laterally of the edge of the plate 11 and in the direction of the interface by the restricting action of the anvils 12 and 13. This arrangement is especially suitable in cases where the plate 10 has a lesser thickness than plate 11, whereby the reducing welding pressure prevents any distortion of the projecting edge of the plate other than the upset displacement or flow of the metal conducive to effecting the welding joint, in the manner described.

For practical purposes, the tip 16 is advantageously designed to have a width about equal to the thickness of the plates being joined. If individual spot welds are made, their length is preferably a multiple of at least five times said width. Furthermore, the depth of the indentation 18 or height of the welding tip 16 should be about 70% of the work thickness in the case of aluminum, to result in a mechanically strong and dependable welding joint. For other metals a greater depth of the indentation will be required in accordance with the greater hardness of most cold weldable metals as compared with aluminum.

The depth of the depression 18 required in a T-joint according to the invention is substantially less than where two members, such as plates, are connected in a lap joint with a single indentation made upon one of the members, as shown and described by U.S. Patent 2,522,408. In the latter case it is necessary for the single indenting tool to penetrate through one of the members and into the other member, to cause an interfacial metal flow conducive to cold pressure welding of the members. In the case of the present invention, which amounts to a kind of combined lap and butt welding, the upset metal flow of the butted member or plate 11 assists or intensifies the flow caused by the indenting tool 16, to result in a combined interfacial metal flow sufficient to effect welding of the members with a minimum depression of about 70% and without through penetration of the indented member.

In the arrangement according to Figs. 1 to 3, a continuous joint between the adjoining surfaces of the plates 10 and 11 may be effected by spacing the individual welds 18 sufficiently close together so that the effective sealed areas of any two adjacent welds meet or overlap each other.

The individual welding joints as shown in Fig. 3 may be produced by either one or a plurality of reciprocating tools 14 or by means of one or more pressure rollers provided with welding teeth and moved in the direction of the seam or line of welds 18. Alternatively, a roller with a continuous projection or circumferential tongue may be used in place of a tooth roller to produce a continuous line weld, as will be readily understood.

Fig. 4 shows an arrangement for cold welding a separating wall of disc 20 in a tube 21 by means of a pair of circular anvils 22 and 23 fitting inside said tube and serving to hold said disc in position and a cooperating welding tool in the form of a roller 24 having a projecting circumferential tongue 45 for applying welding pressure to the outside of the tube 21 opposite to the edge of disc 20, in a manner readily understood from the foregoing. Tools 22 and 23 are again provided with circumferential recesses 22' and 23' respectively, to allow the displaced metal to flow laterally during the welding operation, to produce an efficient and intimate cold weld joint, in the manner described hereinbefore. Alternatively, the roller 24 may be replaced by a plurality of radially slidable pressure applying tools or anvils having arc-shaped inner surfaces engaging the outside of the tube 21 and being provided with suitable welding tongues or teeth in a manner understood from the foregoing.

Fig. 4 shows a similar arrangement for cold welding a closure disc fitting the inside end of a tube by means of a pair of gripping or positioning anvils 28 and 30 and a welding tool 31 of any suitable design described hereinabove. In this case, the inner anvil 28 being suitable recessed at 28' engages the inner face of the disc 27, while anvil 30 engages both the outer face of said disc and the edge of tube 26. If desired, a further recess may be provided in the tool 30. The provision of a single recess 28' on the inner tube results in a smooth joint without a projecting rib at or near the outside of the disc or closure 27.

In the foregoing, the invention has been described with specific reference to an illustrative device or method. It will be evident, however, that numerous modifications and variations, as well as the substitution of equivalent steps and elements for those shown and described herein, may be made without departing from the broader scope and spirit of the invention. The specification and claims are accordingly to be regarded in an illustrative rather than in a restrictive sense.

I claim:

1. A method of joining in a T-butt joint a pair of elongated ductile cold pressure weldable metal members comprising producing a butt end at right angle to the plane of a first member to be joined to a second member, providing the areas of contact of said members to be joined with uncontaminated metallic surfaces, arranging said first member with its butt end in surface-to-surface contact with a planar surface of said second member, supporting the portion of said first member inwardly of the free end portion thereof adjacent to said second member against distortion, and applying, without the addition of external welding heat, to a localized area of said second member having a cross-sectional dimension of the order of the thickness of said second member and opposite to the end of said first member a pressure, to cause an indentation of said second member and to indent and laterally upset the adjoining end of said first member, thereby to produce and divert a metal flow of said first member in the direction of the initial interface of said members such as to create an intense interfacial action between said members by the combined upsetting and indenting actions conducive to joining said members in a solid phase cold welding bond at the interface thereof.

2. A method of joining in a T-butt joint a pair of ductile cold pressure weldable metal plates comprising producing a butt end surface at right angle to the plane of a first plate to be joined to a second plate, providing the areas of contact of said plates to be joined with uncontaminated metallic surfaces, arranging said first plate with its end surface in contact with a planar surface of said second plate, supporting the portion of said first plate inwardly of the free end portion thereof adjacent to said second plate against distortion, and applying, without the addition of external welding heat, to a localized strip-like area of said second plate having a width of the order of the thickness thereof and opposite and parallel to the end surface of said first plate a pressure, to cause an indentation of said second plate, thereby to produce and divert a metal flow of said first plate in the direction of the initial interface of said plates such as to create an intense interfacial action between said plates by the combined upsetting and indenting actions conducive to joining said plates in a solid phase cold welding bond at said area.

3. A method of joining in a T-butt joint a pair of ductile cold pressure weldable metal plates comprising producing a butt end surface at right angle to the plane of a first plate to be joined to a second plate, providing the areas of contact of said plates to be joined with uncontaminated metallic surfaces, arranging said first plate with its end surface in contact with a planar surface of said second plate, supporting the portion of said first plate inwardly of the free end portion thereof adjacent to said second plate against distortion, and applying, without the addition of external welding heat, to a line of localized spaced rectangular welding areas of said second plate having a width of the order of the thickness thereof and opposite and parallel to the end surface of said first plate a pressure, to cause indentations of said second plate and to indent and laterally upset the adjoining end of said first plate, thereby to produce and divert a metal flow of said first plate in the direction of the initial interface of said plates such as to create an intense interfacial action between said plates by the combined upsetting and indenting actions conducive to joining said plates in a plurality of solid phase cold welding joints at said areas.

References Cited in the file of this patent

UNITED STATES PATENTS

| | | |
|---|---|---|
| 2,264,897 | Becker et al. | Dec. 2, 1941 |
| 2,522,408 | Sowter | Sept. 12, 1950 |
| 2,608,887 | Sowter | Sept. 2, 1952 |
| 2,707,824 | Sowter | May 10, 1955 |